United States Patent
Nakanishi et al.

(10) Patent No.: US 9,687,820 B2
(45) Date of Patent: Jun. 27, 2017

(54) EXHAUST GAS CLEANING CATALYST

(71) Applicant: HONDA MOTOR CO., LTD., Tokyo (JP)

(72) Inventors: Yoshiyuki Nakanishi, Wako (JP); Masanori Hashimoto, Wako (JP); Hiroshi Koyama, Wako (JP); Syouji Inose, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 581 days.

(21) Appl. No.: 13/753,516

(22) Filed: Jan. 30, 2013

(65) Prior Publication Data
US 2013/0260987 A1 Oct. 3, 2013

(30) Foreign Application Priority Data

Mar. 30, 2012 (JP) ................................. 2012-080402

(51) Int. Cl.
| | |
|---|---|
| *B01J 23/63* | (2006.01) |
| *B01J 37/02* | (2006.01) |
| *B01J 23/80* | (2006.01) |
| *B01D 53/94* | (2006.01) |

(52) U.S. Cl.
CPC ............ *B01J 23/63* (2013.01); *B01D 53/945* (2013.01); *B01J 23/80* (2013.01); *B01J 37/0215* (2013.01); *B01J 37/0244* (2013.01); *B01D 2255/1023* (2013.01); *B01D 2255/2042* (2013.01); *B01D 2255/2065* (2013.01); *B01D 2255/20792* (2013.01); *Y02T 10/22* (2013.01)

(58) Field of Classification Search
CPC ........ B01J 23/00; B01J 23/0002; B01J 23/44; B01J 23/40; B01J 23/02; B01J 23/06; B01J 23/10; B01J 23/63; B01J 23/80; B01J 23/78; B01J 23/83; B01J 37/0244; B01J 37/0215; B01D 2255/00; B01D 2255/10; B01D 2255/1023; B01D 2255/20; B01D 2255/204; B01D 2255/2042; B01D 2255/2065; B01D 2255/20792; B01D 53/9445; B01D 53/945
See application file for complete search history.

(56) References Cited

FOREIGN PATENT DOCUMENTS

JP 2009-241057 10/2009

OTHER PUBLICATIONS

JP2009-241057 machine tranlsation, Oct. 22, 2009, ("Exhaust Gas Cleaning Catalyst"), Hashimoto et al.*
JP11-226405, machine translation, Aug. 24, 1999 ("Catalyst for Purification of Exhaust Gas and its Production"), Yamamoto et al.*
Okada et al (JP06-000378), see machine translation.*

* cited by examiner

*Primary Examiner* — Melvin C Mayes
*Assistant Examiner* — Smita Patel
(74) *Attorney, Agent, or Firm* — Mori & Ward, LLP

(57) ABSTRACT

An exhaust gas cleaning catalyst for an internal combustion engine includes a cerium-containing oxide, palladium supported on the cerium-containing oxide, zinc supported on the cerium-containing oxide, and barium supported on the cerium-containing oxide.

5 Claims, 2 Drawing Sheets

EXHAUST GAS CLEANING CATALYST

CROSS-REFERENCE TO RELATED APPLICATIONS

The present application claims priority under 35 U.S.C. §119 to Japanese Patent Application No. 2012-080402, filed Mar. 30, 2012, entitled "Exhaust Gas Cleaning Catalyst." The contents of this application are incorporated herein by reference in their entirety.

BACKGROUND OF THE INVENTION

Field of the Invention

The present disclosure relates to an exhaust gas cleaning catalyst.

Discussion of the Background

Heretofore, in order to clean an exhaust gas of an internal combustion engine, exhaust gas cleaning catalysts, such as a three-way catalyst, have been used. The three-way catalyst removes monoxide carbon (CO) and hydrocarbons (HC) contained in an exhaust gas by oxidation thereof and also nitrogen oxides (NOx) contained in the exhaust gas by reduction thereof. As the three-way catalyst described above, for example, a catalyst has been widely used which includes a heat resistant honeycomb base made of cordierite or the like, a support layer of $\gamma$-$Al_2O_3$ or the like provided on the honeycomb base, and a noble metal, such as platinum (Pt) or rhodium (Rh), supported on the support layer.

As the support, since a large specific surface area and high heat resistance are required, besides $Al_2O_3$, for example, $SiO_2$, $ZrO_2$, and $TiO_2$ have been generally used as the supports. In addition, in order to reduce the change in exhaust gas atmosphere, in addition to the above support, $CeO_2$ having an oxygen storage capacity (hereinafter referred to as "OSC") has also been used in combination. Furthermore, in order to improve the OSC durability of $CeO_2$, for example, a composite oxide of $CeO_2$ and $ZrO_2$ has been used.

In addition, because of recent strengthened regulations on exhaust gas, it has been strongly required to clean an exhaust gas immediately after an engine is started. Hence, there has been desired the development of an exhaust gas cleaning catalyst which can be activated in a lower temperature zone and which can exhibit high catalytic activity from a low temperature zone immediately after an engine is started.

Hence, an exhaust gas cleaning catalyst has been proposed which contains a cerium-containing oxide as a primary component and palladium and zinc, each of which is supported on the cerium-containing oxide (Japanese Unexamined Patent Application Publication No. 2009-241057). According to this exhaust gas cleaning catalyst, although the content of the noble metal is small as compared to that of a related exhaust gas cleaning catalyst, high durability can be achieved, and excellent catalytic activity can also be obtained even in a low temperature zone.

SUMMARY OF THE INVENTION

According to one aspect of the present invention, an exhaust gas cleaning catalyst for an internal combustion engine includes a cerium-containing oxide, palladium supported on the cerium-containing oxide, zinc supported on the cerium-containing oxide, and barium supported on the cerium-containing oxide.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
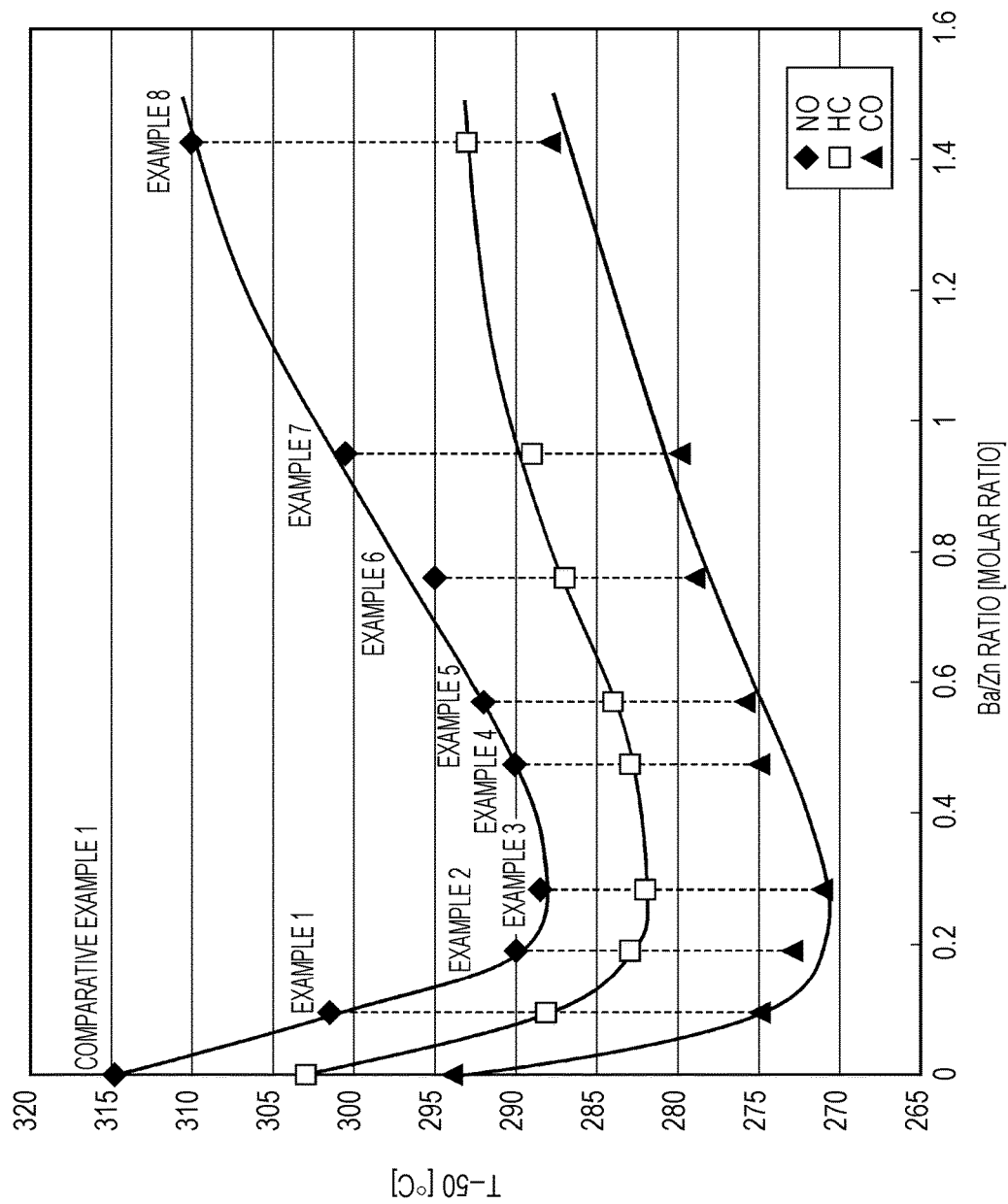
FIG. 1 is a graph showing the relationship between T-50 and the molar ratio of barium to zinc.

The embodiments will now be described with reference to the accompanying drawings, wherein like reference numerals designate corresponding or identical elements throughout the various drawings.

An exhaust gas cleaning catalyst according to one embodiment of the present application is used to remove CO, HC, and $NO_x$ contained in an exhaust gas of an internal combustion engine. In particular, the exhaust gas cleaning catalyst is preferably used to clean an exhaust gas of a gasoline engine and in more particular, is preferably used to remove CO, HC, and $NO_x$ exhausted from a higher output engine or a fuel-efficient engine.

The exhaust gas cleaning catalyst according to this embodiment contains a cerium-containing oxide as a primary component. In addition, the exhaust gas cleaning catalyst according to this embodiment also contains palladium, zinc, and barium, each of which is supported on the cerium-containing oxide. That is, the point of the exhaust gas cleaning catalyst according to this embodiment different from that disclosed in Japanese Unexamined Patent Application Publication No. 2009-241057 is that barium is further supported on the cerium-containing oxide which supports palladium and zinc.

[Cerium-Containing Oxide]

The cerium-containing oxide supports palladium, zinc, and barium as a support and also functions as an OSC agent. The cerium-containing oxide is not particularly limited as long as it is an oxide containing cerium, and a known cerium-containing oxide may be used. In particular, cerium oxide is preferably used, and in addition, a mixed oxide containing cerium and at least one selected from the group consisting of zirconium, yttrium, praseodymium, neodymium, terbium, samarium, gadolinium, and lanthanum and/or a composite oxide having a basic composition containing cerium and at least one of the elements mentioned above is preferably used.

The cerium-containing oxide is a primary component of the exhaust gas cleaning catalyst according to this embodiment. The content of the cerium-containing oxide is preferably 50 to 99 percent by mass to the total of the exhaust gas cleaning catalyst. When the content of the cerium-containing oxide is in the range described above, this cerium-containing oxide effectively functions as the support and the OSC agent. The content of the cerium-containing oxide is more preferably 60 to 99 percent by mass to the total of the exhaust gas cleaning catalyst.

[Palladium]

Palladium functioning as a catalytic metal is supported on the cerium-containing oxide functioning as the support. Palladium is less expensive than platinum and has preferable catalytic activity. The content of palladium is preferably 0.5 to 7 percent by mass to the exhaust gas cleaning catalyst. When the content of palladium is 0.5 percent by mass or more, sufficient catalytic activity can be obtained. Even when the content of palladium exceeds 7 percent by mass, further improvement of the effect cannot be expected; hence, when the content is 7 percent by mass or less, advantages in terms of cost can also be obtained. The content of palladium is more preferably 0.5 to 5 percent by mass to the exhaust gas cleaning catalyst.

Next, the effect obtained when palladium is supported on the cerium-containing oxide, such as cerium oxide ($CeO_2$), will be described in detail.

First, when an exhaust gas passes through the exhaust gas cleaning catalyst according to this embodiment, CO contained in the exhaust gas is adsorbed on palladium, and oxygen in the cerium-containing oxide located close to palladium then attacks the adsorbed CO, so that CO is converted into $CO_2$. Next, $H_2O$ attacks lattice defects generated by desorption in the cerium-containing oxide to advance a water gas shift reaction ($CO+H_2O \rightarrow CO_2+H_2$), so that $H_2$ is generated and removed. As the operation described above is repeatedly carried out, the water gas shift reaction which uses oxygen (defects) in the cerium-containing oxide is promoted. As described above, when palladium is supported on the cerium-containing oxide, since the water gas shift reaction can be promoted, and burning reactions of HC and CO are also simultaneously initiated and promoted, the catalyst can be rapidly activated by reaction heat generated thereby.

[Zinc]

Zinc used for the exhaust gas cleaning catalyst according to this embodiment is supported on the cerium-containing oxide. Since zinc is supported on the cerium-containing oxide, high durability can be obtained while excellent cleaning ability in a low temperature zone is maintained. Hence, by addition of zinc, the content of expensive palladium can be decreased.

In addition, when zinc is supported on the cerium-containing oxide, many oxygen defects or active oxygen species can be generated in the cerium-containing oxide, such as cerium oxide. Accordingly, the water gas shift reaction characteristics described above can be further improved, and as a result, the exhaust gas cleaning catalyst can be more rapidly activated.

In this embodiment, the content of zinc to the total of the cerium-containing oxide, zinc, and barium which will be described later is preferably in a range of 1 to 10 percent by mass. By the content described above, even if the exhaust gas cleaning catalyst is used for a long period of time, the surface of the cerium-containing oxide can be more reliably suppressed from being formed into cerium carbonate. Accordingly, since a sufficient amount of active oxygen can be released from the cerium-containing oxide, the exhaust gas cleaning catalyst can be rapidly activated from a low temperature zone, and as a result, excellent cleaning activity can be obtained.

When the content of zinc to the total of the cerium-containing oxide, zinc, and barium is less than 1 percent by mass, the water gas shift reaction cannot be promoted by zinc, and a sufficient amount of active oxygen cannot be released from the cerium-containing oxide. On the other hand, when the content of zinc exceeds 10 percent by mass, the area of the cerium-containing oxide covered with zinc is increased, and as a result, a sufficient amount of active oxygen cannot be released from the cerium-containing oxide. The content of zinc to the total of the cerium-containing oxide, zinc, and barium which will be described below is more preferably in a range of 3 to 5 percent by mass.

[Barium]

Barium used for the exhaust gas cleaning catalyst according to this embodiment is supported on the cerium-containing oxide. Hereinafter, the reasons the exhaust gas cleaning catalyst disclosed in Japanese Unexamined Patent Application Publication No. 2009-241057 cannot be rapidly activated in a low temperature zone when used for a long period of time, which were found through the research carried out by the present inventors, will be described in detail.

That is, according to the exhaust gas cleaning catalyst disclosed in Japanese Unexamined Patent Application Publication No. 2009-241057, the water gas shift reaction ($CO+H_2O \rightarrow CO_2+H_2$) progresses by the presence of palladium and zinc, and also as shown in the following formula (1), a reaction progresses in which the surface of the cerium-containing oxide is formed into cerium carbonate. Hence, when the exhaust gas cleaning catalyst is used for a long period of time, the surface of the cerium-containing oxide located close to palladium and zinc is formed into cerium carbonate. As a result, the active oxygen releasing ability in a low temperature zone, which is an inherent characteristic of the cerium-containing oxide, cannot be sufficiently obtained, and consequently, the rapid catalytic activation of the exhaust gas cleaning catalyst becomes difficult to obtain.

$$2CeO_2 + 3CO_2 \rightarrow Ce_2(CO_3)_3 + \tfrac{1}{2}O_2 \qquad (1)$$

Accordingly, in this embodiment, barium is further supported on the cerium-containing oxide which supports palladium and zinc. By the composition described above, as shown in the following formula (2), cerium carbonate once generated on the surface of the cerium-containing oxide is allowed to react with barium to form barium carbonate. Since the barium carbonate thus generated is adsorbed on or stored in barium, the surface of the cerium-containing oxide, which is formed into cerium carbonate, is returned to the original state. Hence, this embodiment can provide an exhaust gas cleaning catalyst which can be rapidly activated from a low temperature zone even if used for a long period of time.

$$Ce_2(CO_3)_3 + 3Ba + 2O_2 \rightarrow 3BaCO_3 + 2CeO_2 \qquad (2)$$

In addition, barium carbonate adsorbed on or stored in barium can be recovered to the original state when an exhaust gas air/fuel ratio is set in a rich state, or an exhaust gas temperature is increased. Hence, even if the exhaust gas cleaning catalyst is used for a long period of time, the above effect of barium can be maintained.

In this embodiment, the molar ratio of barium to zinc (number of moles of barium/number of moles of zinc) is preferably in a range of 0.1 to 1.0. By this molar ratio, even if the exhaust gas cleaning catalyst is used for a long period of time, the surface of the cerium-containing oxide can be reliably suppressed from being formed into cerium carbonate. Accordingly, since a sufficient amount of active oxygen can be released from the cerium-containing oxide, the exhaust gas cleaning catalyst can be rapidly activated from a low temperature zone, and as a result, excellent cleaning activity can be obtained.

When the molar ratio of barium to zinc is less than 0.1, the surface of the cerium-containing oxide cannot be sufficiently suppressed by barium from being formed into cerium carbonate, and a sufficient amount of active oxygen cannot be released from the cerium-containing oxide. On the other hand, when the molar ratio of barium to zinc exceeds 1.0, the area of zinc covered with barium is increased, and as a result, the water gas shift reaction cannot be promoted by zinc, so that a sufficient amount of active oxygen cannot be released from the cerium-containing oxide. The molar ratio of barium to zinc is more preferably in a range of 0.2 to 0.4.

In addition, as long as the effect of the present application can be obtained, the exhaust gas cleaning catalyst according to this embodiment may further contain components other than those described above. For example, catalytic metal components other than palladium and/or oxides other than the cerium-containing oxide may be contained, and other additives and the like may also be contained.

In addition, a method for preparing the exhaust gas cleaning catalyst according to this embodiment is not particularly limited, and for example, a known slurry method may be used. In addition, the exhaust gas cleaning catalyst according to this embodiment can be obtained, for example, by applying a slurry containing a cerium-containing oxide, palladium, zinc, and barium on a cordierite-made honeycomb support member and then firing the slurry.

In addition, the present application is not limited to the above embodiments and may be changed and modified without departing from the scope of the present application.

EXAMPLES

Next, although the present application will be described in more detail with reference to the following examples, the present application is not limited thereto.

Examples 1 to 8

[Pd/Ba/Zn/CeO$_2$ Catalyst]
(Operation a)

First, 95 g of cerium oxide (manufactured by Nikki Co., Ltd.), 36.16 g of zinc nitrate hexahydrate (Cica reagent grade guaranteed and manufactured by Kanto Chemical Co., Inc.), and 1,000 g of ion exchanged water were charged in an egg plant flask, and excessive water was removed by a rotary evaporator. Subsequently, drying was performed in a drying furnace at 200° C. for 2 hours, and firing was further performed in a muffle furnace at 500° C. for 2 hours, so that a powder (A1) was obtained.

(Operation b)

Barium nitrate (Cica reagent grade guaranteed and manufactured by Kanto Chemical Co., Inc.) in an amount shown in Table 1, the powder (A1), and 1,000 g of ion exchanged water were charged in an egg plant flask, and excessive water was removed by a rotary evaporator. Subsequently, drying was performed in a dry furnace at 200° C. for 2 hours, and firing was further performed in a muffle furnace at 500° C. for 2 hours, so that a powder (B1) was obtained.

(Operation c)

First, 2.268 g of DL-malic acid (Cica reagent grade guaranteed and manufactured by Kanto Chemical Co., Inc.), 2.329 g of palladium nitrate (manufactured by Kojima Chemicals Co., Ltd.), and 600 g of ion exchanged water were charged in a beaker and were then stirred for 1 hour. The aqueous solution thus stirred and 89.1 g of the powder (B1) were charged in an egg plant flask, and excessive water was removed by a rotary evaporator. Subsequently, drying was performed in a dry furnace at 200° C. for 2 hours, and firing was further performed in a muffle furnace at 800° C. for 2 hours, so that a powder (C1) was obtained.

(Operation d)

First, 40 g of the powder (C1), 50 g of alumina sol (Al$_2$O$_3$ concentration: 20%, manufactured by Nissan Chemical Industries, Ltd.), and alumina balls were charged in a polyethylene-made container (250 ml) and were then wet-pulverized for 14 hours, so that a slurry (D1) was obtained.

(Operation e)

A cordierite-made honeycomb support member having a honeycomb 25.4 mm in diameter and 60 mm in length (30 cc) which included 400 cells/in$^2$ each with a thickness of 3.5 mil was immersed in the slurry (D1) thus obtained. Next, this honeycomb support member was recovered from the slurry, and excessive portions were removed by air jet. After the removal was performed, the honeycomb support member was heated at 200° C. for 2 hours. The operation described above was repeatedly performed until a predetermined support amount was obtained. After the predetermined support amount was obtained, firing was performed in a muffle furnace at 500° C. for 2 hours, so that Pd/Ba/Zn/CeO$_2$ was obtained. In Examples 1 to 8, the wash coat amounts were each 200 g/L.

Examples 9 to 16

[Pd/Ba/Zn/CeO$_2$ Catalyst]
(Operation a)

Cerium oxide (manufactured by Nikki Co., Ltd.), zinc nitrate hexahydrate (Cica reagent grade guaranteed and manufactured by Kanto Chemical Co., Inc.), the amounts of which are shown in Table 2, and 1,000 g of ion exchanged water were charged in an egg plant flask, and excessive water was removed by a rotary evaporator. Subsequently, drying was performed in a drying furnace at 200° C. for 2 hours, and firing was further performed in a muffle furnace at 500° C. for 2 hours, so that a powder (A2) was obtained.

(Operation b)

Barium nitrate (Cica reagent grade guaranteed and manufactured by Kanto Chemical Co., Inc.) in an amount shown in Table 2, the powder (A2), and 1,000 g of ion exchanged water were charged in an egg plant flask, and excessive water was removed by a rotary evaporator. Subsequently, drying was performed in a dry furnace at 200° C. for 2 hours, and firing was further performed in a muffle furnace at 500° C. for 2 hours, so that a powder (B2) was obtained.

(Operation c)

First, 2.268 g of DL-malic acid (Cica reagent grade guaranteed and manufactured by Kanto Chemical Co., Inc.), 2.329 g of palladium nitrate (manufactured by Kojima Chemicals Co., Ltd.), and 600 g of ion exchanged water were charged in a beaker and were then stirred for 1 hour. The aqueous solution thus stirred and 89.1 g of the powder (B2) were charged in an egg plant flask, and excessive water was removed by a rotary evaporator. Subsequently, drying was performed in a dry furnace at 200° C. for 2 hours, and firing was further performed in a muffle furnace at 800° C. for 2 hours, so that a powder (C2) was obtained.

(Operation d)

First, 40 g of the powder (C2), 50 g of alumina sol (Al$_2$O$_3$ concentration: 20%, manufactured by Nissan Chemical Industries, Ltd.), and alumina balls were charged in a polyethylene-made container (250 ml) and were then wet-pulverized for 14 hours, so that a slurry (D2) was obtained.

(Operation e)

A cordierite-made honeycomb support member having a honeycomb 25.4 mm in diameter and 60 mm in length (30 cc) which included 400 cells/in$^2$ each with a thickness of 3.5 mil was immersed in the slurry (D2) thus obtained. Next, this honeycomb support member was recovered from the slurry, and excessive portions were removed by air jet. After the removal was performed, the honeycomb support member was heated at 200° C. for 2 hours. The operation described above was repeatedly performed until a predetermined support amount was obtained. After the predetermined support amount was obtained, firing was performed in a muffle furnace at 500° C. for 2 hours, so that Pd/Ba/Zn/CeO$_2$ was obtained. In Examples 9 to 16, the wash coat amounts were each 200 g/L.

Comparative Example 1

[Pd/Zn/CeO$_2$]
(Operation a)

First, 95 g of cerium oxide (manufactured by Nikki Co., Ltd.), 36.16 g of zinc nitrate hexahydrate (Cica reagent grade guaranteed and manufactured by Kanto Chemical Co., Inc.), and 1,000 g of ion exchanged water were charged in an egg plant flask, and excessive water was removed by a rotary evaporator. Subsequently, drying was performed in a drying furnace at 200° C. for 2 hours, and firing was further performed in a muffle furnace at 500° C. for 2 hours, so that a powder (A3) was obtained.

(Operation b)

First, 2.268 g of DL-malic acid (Cica reagent grade guaranteed and manufactured by Kanto Chemical Co., Inc.), 2.329 g of palladium nitrate (manufactured by Kojima Chemicals Co., Ltd.), and 600 g of ion exchanged water were charged in a beaker and were then stirred for 1 hour. The aqueous solution thus stirred and 89.1 g of the powder (A3) were charged in an egg plant flask, and excessive water was removed by a rotary evaporator. Subsequently, drying was performed in a dry furnace at 200° C. for 2 hours, and firing was further performed in a muffle furnace at 800° C. for 2 hours, so that a powder (B3) was obtained.

(Operation c)

First, 40 g of the powder (B3), 50 g of alumina sol (Al$_2$O$_3$ concentration: 20%, manufactured by Nissan Chemical Industries, Ltd.), and alumina balls were charged in a polyethylene-made container (250 ml) and were then wet-pulverized for 14 hours, so that a slurry (C3) was obtained.

(Operation d)

A cordierite-made honeycomb support member having a honeycomb 25.4 mm in diameter and 60 mm in length (30 cc) which included 400 cells/in$^2$ each with a thickness of 3.5 mil was immersed in the slurry (C3) thus obtained. Next, this honeycomb support member was recovered from the slurry, and excessive portions were removed by air jet. After the removal was performed, the honeycomb support member was heated at 200° C. for 2 hours. The operation described above was repeatedly performed until a predetermined support amount was obtained. After the predetermined support amount was obtained, firing was performed in a muffle furnace at 500° C. for 2 hours, so that Pd/Zn/CeO$_2$ was obtained. The wash coat amount was 200 g/L.

The compositions of Examples 1 to 8 and Comparative Example 1 are collectively shown in Table 1. In addition, the compositions of Examples 9 to 16 are also collectively shown in Table 2.

TABLE 1

|  | Ba/Zn (Molar Ratio) | Ba content in Ba/Zn/CeO$_2$ | Addition amount of barium nitrate | Addition amount of powder A1 |
|---|---|---|---|---|
| Example 1 | 0.1 | 1.0 Mass % | 1.90 g | 99 g |
| Example 2 | 0.19 | 2.0 Mass % | 3.81 g | 98 g |
| Example 3 | 0.29 | 3.0 Mass % | 5.70 g | 97 g |
| Example 4 | 0.48 | 5.0 Mass % | 9.52 g | 95 g |
| Example 5 | 0.57 | 6.0 Mass % | 11.42 g | 94 g |
| Example 6 | 0.76 | 8.0 Mass % | 15.23 g | 92 g |
| Example 7 | 0.95 | 10.0 Mass % | 19.03 g | 90 g |
| Example 8 | 1.43 | 15.0 Mass % | 28.56 g | 85 g |
| Comparative Example 1 | 0 | 0 | 0 | — |

TABLE 2

|  | Ba/Zn (Molar Ratio) | Zn content in Ba/Zn/CeO$_2$ | Addition amount of Zn nitrate | Addition amount of CeO$_2$ | Ba content in Ba/Zn/CeO$_2$ | Addition amount of barium nitrate | Addition amount of powder A2 |
|---|---|---|---|---|---|---|---|
| Example 9 | 0.29 | 0.5 Mass % | 2.27 g | 99.5 g | 0.3 Mass % | 0.57 g | 99.7 g |
| Example 10 | 0.29 | 1.0 Mass % | 4.45 g | 99 g | 0.6 Mass % | 1.14 g | 99.4 g |
| Example 11 | 0.29 | 2.0 Mass % | 9.10 g | 98 g | 1.2 Mass % | 2.28 g | 98.8 g |
| Example 12 | 0.29 | 3.0 Mass % | 13.65 g | 97 g | 1.8 Mass % | 3.43 g | 98.2 g |
| Example 13 | 0.29 | 5.0 Mass % | 22.75 g | 95 g | 3.0 Mass % | 5.71 g | 97 g |
| Example 14 | 0.29 | 7.0 Mass % | 31.85 g | 93 g | 4.2 Mass % | 8.0 g | 95.8 g |
| Example 15 | 0.29 | 10.0 Mass % | 45.49 g | 90 g | 6.0 Mass % | 11.41 g | 94 g |
| Example 16 | 0.29 | 20.0 Mass % | 90.99 g | 80 g | 12.0 Mass % | 22.84 g | 88 g |

<Evaluation>

First, an aging treatment (durability test) was performed under the following conditions in which a stoichiometric model gas was allowed to pass through the exhaust gas cleaning catalyst each obtained in Examples 1 to 16 and Comparative Example 1. Next, under the following conditions, a model gas was allowed to pass through each exhaust gas cleaning catalyst processed by the aging treatment, so that a cerium carbonate forming treatment was performed to convert the surface of cerium oxide into cerium carbonate.

[Aging Treatment Conditions]
Temperature: 980° C.
Time: 20 hours
Stoichiometric model gas composition: C$_3$H$_6$=1%, O$_2$=0.5%, H$_2$O=10%
Gas flow rate: 1 L/min

Figure 2:
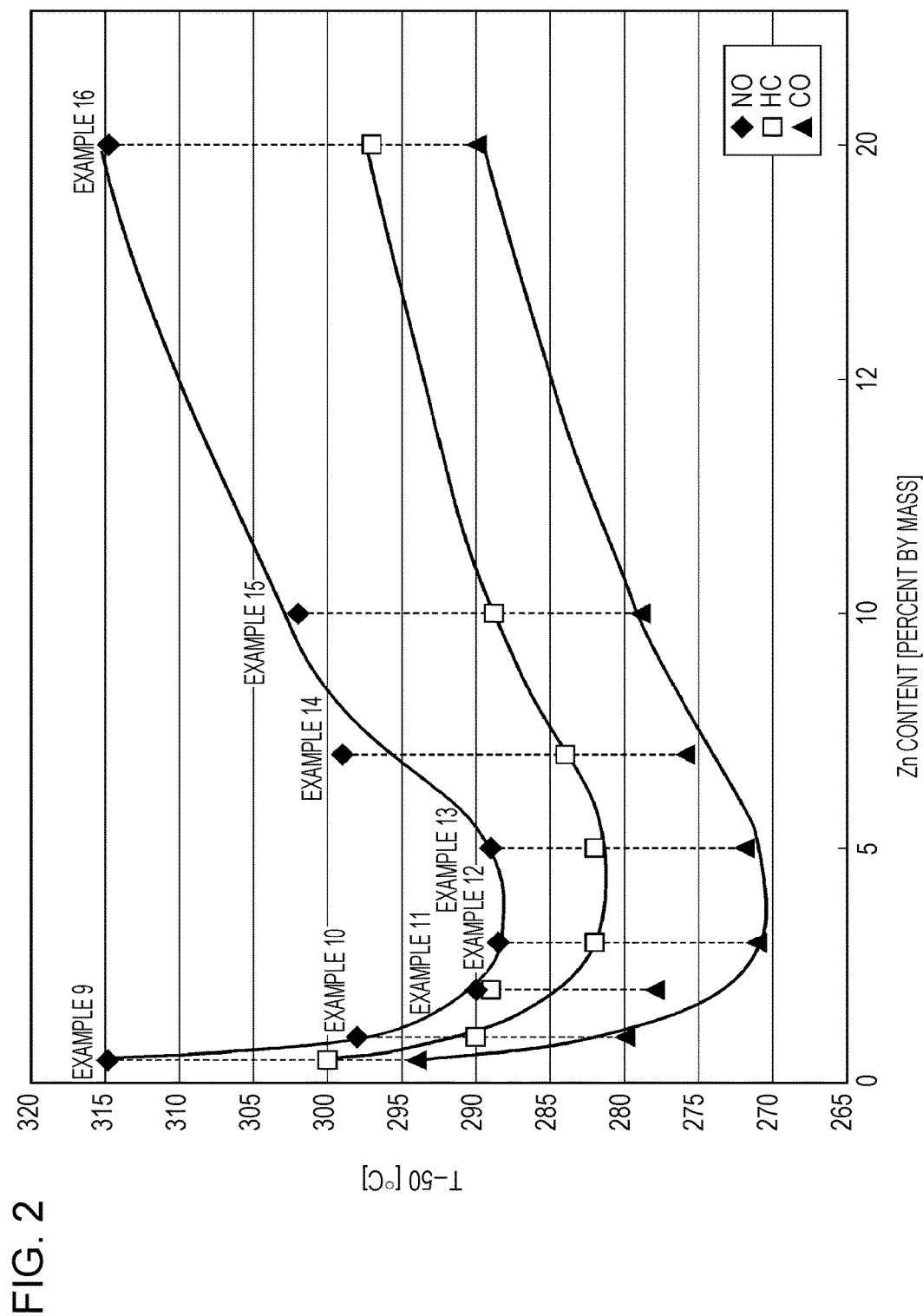
FIG. 2 is a graph showing the relationship between T-50 and the content of zinc to the total of a cerium-containing oxide, zinc, and barium on a percent by mass basis.

[Cerium Carbonate Forming Treatment Conditions]
Temperature: 450° C.
Time: 10 min
Model gas composition: NO=500 ppm, C$_3$H$_6$=400 ppm, CO=6%, O$_2$=3.24%, H$_2$=0.17%, CO$_2$=14%, H$_2$O=10%, N$_2$: balance gas
Gas flow rate: 25 L/min After the cerium carbonate forming treatment was performed, the cleaning rate of each of CO, HC, and NO obtained when the model gas was allowed to pass under the following conditions, that is, in particular, T-50 (° C.) which is the temperature at which each component was cleaned by 50%, was evaluated. The evaluation results are shown in FIGS. 1 and 2.

[Model Gas Conditions]

Model gas composition: NO=500 ppm, $C_3H_6$=400 ppm, CO=0.5%, $O_2$=0.49%, $H_2$=0.17%, $CO_2$=14%, $H_2O$=10%, $N_2$: balance gas SV (space velocity): 50 k/h Linear temperature rise rate: 20° C./min As shown in Table 1 and FIG. 1, it was found that in Examples 1 to 8 in which palladium, zinc, and barium were supported on cerium oxide functioning as the cerium-containing oxide, T-50 of each of CO, HC, and NO was low as compared to that of Comparative Example 1 in which barium was not supported. From the results described above, it was confirmed that according to the examples in which palladium, zinc, and barium were supported on the cerium-containing oxide, even if used for a long period of time, the exhaust gas cleaning catalyst could be rapidly activated from a low temperature zone, and excellent catalytic activity could be obtained.

In addition, among Examples 1 to 8, it was found that according to Examples 1 to 7 in which the molar ratio of barium to zinc (number of moles of barium/number of moles of zinc) was 0.1 to 1.0, a lower T-50 could be obtained from each of CO, HC, and NO. Among the above examples, it was found that in Example 3 in which the molar ratio of barium to zinc was 0.2 to 0.4, a particularly low T-50 could be obtained from each of CO, HC, and NO.

In addition, as shown in Table 2 and FIG. 2, it was found that among Examples 9 to 16 in which the molar ratio of barium to zinc was 0.29, according to Examples 10 to 15 in which the content of zinc to the total of the cerium oxide functioning as the cerium-containing oxide, zinc, and barium was 1 to 10 percent by mass, a lower T-50 could be obtained from each of CO, HC, and NO. Among the above examples, it was found that according to Examples 12 and 13 in which the content of zinc to the total of the cerium oxide functioning as the cerium-containing oxide, zinc, and barium was 3 to 5 percent by mass, a particularly low T-50 could be obtained from each of CO, HC, and NO.

Obviously, numerous modifications and variations of the present invention are possible in light of the above teachings. It is therefore to be understood that within the scope of the appended claims, the invention may be practiced otherwise than as specifically described herein.

What is claimed is:

1. An exhaust gas cleaning catalyst for an internal combustion engine, comprising:
   a cerium-containing oxide;
   palladium supported on the cerium-containing oxide;
   zinc supported on the cerium-containing oxide; and
   barium supported on the cerium-containing oxide,
   wherein the exhaust gas cleaning catalyst is obtained by a method comprising:
      mixing cerium oxide and zinc nitrate;
      firing the mixed cerium oxide and zinc nitrate to obtain a first powder;
      mixing the first powder with barium nitrate;
      firing the mixed first powder and barium nitrate to obtain a second powder;
      mixing the second powder with palladium nitrate; and
      firing the mixed second powder and palladium nitrate.

2. The exhaust gas cleaning catalyst according to claim 1, wherein a molar ratio of the barium to the zinc is 0.1 to 1.0.

3. The exhaust gas cleaning catalyst according to claim 1, wherein a molar ratio of the barium to the zinc is 0.2 to 0.4.

4. The exhaust gas cleaning catalyst according to claim 1, wherein the content of the zinc to a total of the cerium-containing oxide, the zinc, and the barium is 3 to 5 percent by mass.

5. The exhaust gas cleaning catalyst according to claim 1, wherein a content of the zinc to a total of the cerium-containing oxide, the zinc, and the barium is 1 to 10 percent by mass.

* * * * *